(12) United States Patent
Kweon et al.

(10) Patent No.: US 8,760,603 B2
(45) Date of Patent: Jun. 24, 2014

(54) LIQUID CRYSTAL DISPLAY AND BACKLIGHT UNIT COMPRISING A BOTTOM COVER INCLUDING A THROUGH HOLE WHEREIN A CONNECTOR IS EXPOSED TO THE OUTSIDE OF A BOTTOM SURFACE OF THE BOTTOM COVER

(75) Inventors: Youngmin Kweon, Gumi-si (KR); Youngeun Lee, Daegu (KR); Junghoon Park, Kyungsan-si (KR)

(73) Assignee: LG Display Co., Ltd., Seoul (KR)

( * ) Notice: Subject to any disclaimer, the term of this patent is extended or adjusted under 35 U.S.C. 154(b) by 370 days.

(21) Appl. No.: 12/903,634

(22) Filed: Oct. 13, 2010

(65) Prior Publication Data

US 2011/0273642 A1     Nov. 10, 2011

(30) Foreign Application Priority Data

May 4, 2010     (KR) ......................... 10-2010-0041918

(51) Int. Cl.
*G02F 1/1335*     (2006.01)
*F21V 21/30*     (2006.01)

(52) U.S. Cl.
USPC .............................. 349/65; 362/612; 362/632

(58) Field of Classification Search
USPC ........ 349/61, 65, 69; 362/600, 612, 630–634, 362/97.1–97.4
See application file for complete search history.

(56) References Cited

U.S. PATENT DOCUMENTS

2007/0002590 A1*   1/2007   Jang et al. ..................... 362/633

FOREIGN PATENT DOCUMENTS

| CN | 2768131 Y | 3/2006 |
|---|---|---|
| KR | 10-2006-0016877 A | 2/2006 |
| KR | 10-2008-0002135 A | 1/2008 |

* cited by examiner

*Primary Examiner* — Paul Lee
(74) *Attorney, Agent, or Firm* — Mckenna, Long & Aldridge, LLP.

(57) ABSTRACT

A backlight unit and a liquid crystal display using the same are disclosed. The backlight unit includes a plurality of light sources generating light, a light source printed circuit board (PCB) on which the plurality of light sources are mounted, a protrusion that protrudes from one side of the light source PCB and is fastened to a connector used to supply a driving power to the plurality of light sources, and a bottom cover that receives the light source PCB and has a through hole through which the protrusion passes. The connector is exposed to the outside through the through hole.

7 Claims, 9 Drawing Sheets

LIQUID CRYSTAL DISPLAY AND BACKLIGHT UNIT COMPRISING A BOTTOM COVER INCLUDING A THROUGH HOLE WHEREIN A CONNECTOR IS EXPOSED TO THE OUTSIDE OF A BOTTOM SURFACE OF THE BOTTOM COVER

This application claims the benefit of Korea Patent Application No. 10-2010-0041918 filed on May 4, 2010, which is incorporated herein by reference for all purposes as if fully set forth herein.

BACKGROUND OF THE INVENTION

1. Field of the Invention

Exemplary embodiments of the invention relate to a backlight unit and a liquid crystal display using the same.

2. Discussion of the Related Art

A range of application for liquid crystal displays has gradually widened because of its excellent characteristics such as light weight, thin profile, and low power consumption. The liquid crystal displays have been used in personal computers such as notebook PCs, office automation equipments, audio/video equipments, interior/outdoor advertising display devices, and the like. A backlit liquid crystal display occupying most of the liquid crystal displays controls an electric field applied to a liquid crystal layer and modulates light coming from a backlight unit, thereby displaying an image.

The backlight unit is classified into a direct type backlight unit and an edge type backlight unit. In the direct type backlight unit, a plurality of light sources are positioned on a lower surface of a diffusion plate, and thus light travels to a back surface of a liquid crystal display panel. On the other hand, the edge type backlight unit includes a plurality of light sources positioned opposite the side of a light guide plate and a plurality of optical sheets between the liquid crystal display panel and the light guide plate. In the edge type backlight unit, the light guide plate converts line light or point light coming from the light sources into planar light, and the optical sheets allow the planar light to travel to the back surface of the liquid crystal display panel.

More specifically, the edge type backlight unit includes a cover bottom, the plurality of light sources that are positioned at one side of the cover bottom and provide light, the light guide plate that is positioned under the liquid crystal display panel so as to guide light from the light sources to the liquid crystal display panel, a reflection sheet for reflecting light reflected under the light guide plate to the front of the light guide plate, the plurality of optical sheets that are stacked on the light guide plate and provide uniform light to the liquid crystal display panel, and a guide panel for supporting the liquid crystal display panel.

In the related art, a cold cathode fluorescent lamp (CCFL), a hot cathode fluorescent lamp (HCFL), an external electrode fluorescent lamp (EEFL), etc. were used as the light source of the backlight unit. However, a light emitting diode (LED) has been recently spotlighted because it can be driven at a low voltage and has excellent characteristics such as low power consumption, an excellent color reproduction characteristic, an excellent contrast ratio, and a long life span.

As shown in FIG. 1, when the LED is generally used as the light source in the related art, a plurality of LEDs 1 are mounted on a light source printed circuit board (PCB) 2 to constitute an LED array. The LED array is fastened to the side of a bottom cover 4 with a heat sink 3 interposed between the LED array and the bottom cover 4. A connector 5 is fastened to one side of the light source PCB 2 and thus is used to apply a driving power supplied through a wire 6 to the LEDs 1. The wire 6 is electrically connected to a light source driver (not shown) via a through hole 7 formed in a bottom surface of the bottom cover 4.

In the related art backlight unit, because the connector 5 is positioned inside a liquid crystal module including the liquid crystal display panel and the backlight unit, the wire 6 is fastened to the connector 5 in an initial assembly stage (i.e., before the reflection sheet, the light guide plate, etc. are assembled) of the backlight unit and then has to be drawn out through the through hole 7. The backlight unit may include the plurality of connectors 5 based on its type. As a result, in the related art, when the wire 6 is drawn out, an assembly performance may be reduced because it is difficult to arrange the wire 6. This increases the assembly cost.

Further, in the related art, because the wire 6 is fastened to the connector 5 in the initial assembly stage of the backlight unit, it is impossible for a user to confirm whether or not the wire 6 is well fastened to the connector 5 with his or her eyes after the assembly of the liquid crystal module is completed.

Further, in the related art, because a bezel width BZ of the liquid crystal display is forced to increase by an area of the light source PCB 2 the connector 5 occupies, it is difficult to achieve a narrow bezel technology.

SUMMARY OF THE INVENTION

Exemplary embodiments of the invention provide a backlight unit and a liquid crystal display using the same capable of improving an assembly performance and reducing the assembly cost.

In one aspect, there is a backlight unit comprising a plurality of light sources configured to generate light, a light source printed circuit board (PCB) on which the plurality of light sources are mounted, a protrusion that protrudes from one side of the light source PCB and is fastened to a connector used to supply a driving power to the plurality of light sources, and a bottom cover configured to receive the light source PCB and have a through hole through which the protrusion passes. The connector is exposed to the outside through the through hole.

The protrusion protrudes in a width direction of the light source PCB.

The through hole is formed in a bottom surface of the bottom cover, and the connector is exposed to a back surface of the bottom cover.

The backlight unit further comprises a light guide plate configured to convert light coming from the light sources into planar light. The light source PCB is fastened to at least one of upper, lower, left, and right side walls of the bottom cover so that the light sources are positioned opposite the side of the light guide plate.

In another aspect, there is a liquid crystal display comprising a liquid crystal display panel configured to display an image, and a backlight unit configured to provide light to a back surface of the liquid crystal display panel. The backlight unit includes a plurality of light sources configured to generate light, a light source PCB on which the plurality of light sources are mounted, a protrusion that protrudes from one side of the light source PCB and is fastened to a connector used to supply a driving power to the plurality of light sources, and a bottom cover configured to receive the light source PCB and have a through hole through which the protrusion passes. The connector is exposed to the outside through the through hole.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Figure 1:
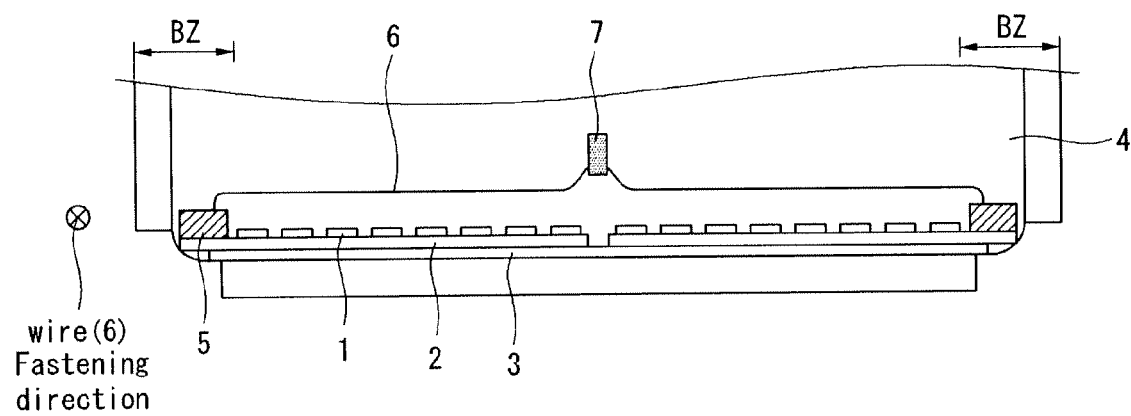
FIG. 1 schematically illustrates a portion of a related art backlight unit.

Reference will now be made in detail embodiments of the invention examples of which are illustrated in the accompanying drawings.

Hereinafter, a backlight unit according to an exemplary embodiment of the invention and a liquid crystal display using the backlight unit are described in detail with reference to the accompanying drawings. Like reference numerals designate like elements throughout the specification.

Figure 2:
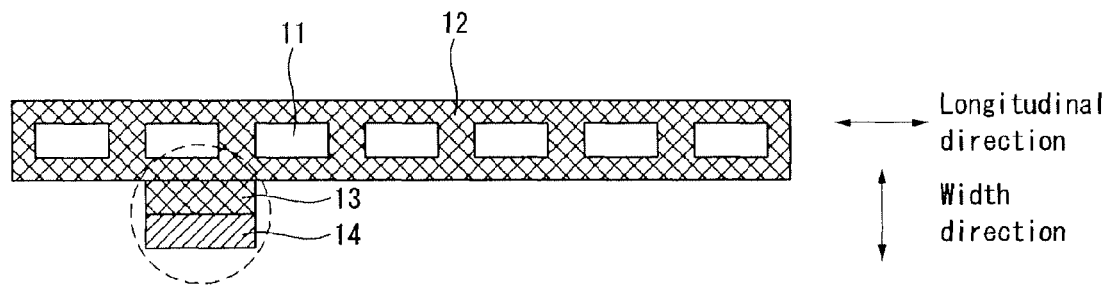
FIG. 2 partially illustrates an LED array of an edge type backlight unit according to an exemplary embodiment of the invention.
Figure 3:
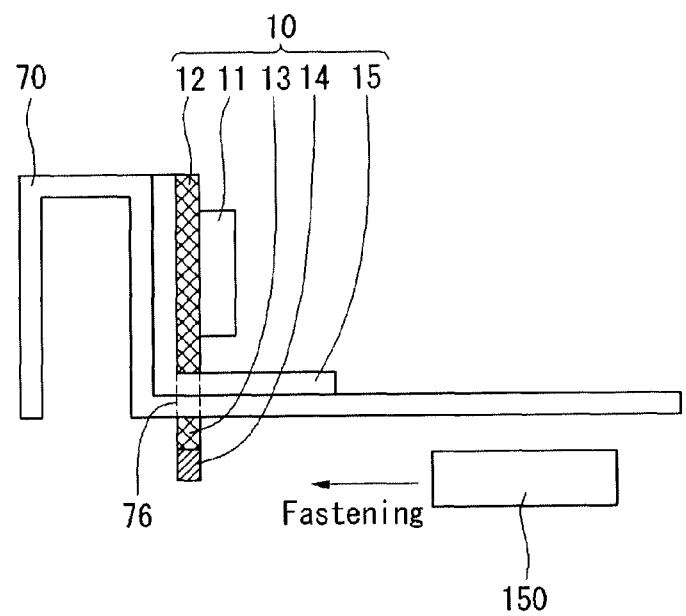
FIG. 3 illustrates a coupling structure between an LED array and a bottom cover according to an exemplary embodiment of the invention.

First, the backlight unit according to the exemplary embodiment of the invention is described. FIG. 2 partially illustrates a light emitting diode (LED) array of an edge type backlight unit according to an exemplary embodiment of the invention. FIG. 3 illustrates a coupling structure between the LED array and a bottom cover.

As shown in FIGS. 2 and 3, an LED array 10 includes a plurality of LEDs 11 used as a light source, a light source printed circuit board (PCB) 12 on which the plurality of LEDs 11 are mounted, and a protrusion 13 that protrudes from the light source PCB 12 and provides a fastening space of a connector 14.

The protrusion 13 protrudes in a width direction of the light source PCB 12. The protrusion 13 may have any shape such as a rectangle and a circle. Further, a formation location of the protrusion 13 on the light source PCB 12 is not limited. The protrusion 13 passes through a bottom surface of a bottom cover 70. The connector 14 attached to the protrusion 13 passes through the bottom surface of the bottom cover 70 and is exposed to the outside. One protrusion 13 and one connector 14 may be used. Furthermore, the plurality of protrusions 13 and the plurality of connectors 14 may be used for a voltage division of the LEDs 11 and a block drive of the LED array 10. When the plurality of protrusions 13 and the plurality of connectors 14 are used, an arrangement of wires in the exemplary embodiment of the invention may be simpler than the related art. Hence, it is advantageous to a reduction in a width of the light source PCB 12.

A backlight unit includes the LED array 10 and the bottom cover 70. The LED array 10 is fastened to a side wall of the bottom cover 70. In this case, the LED array 10 may further include a heat sink 15 for rapidly discharging heat generated in the light source PCB 12 to the bottom cover 70. The heat sink 15 is positioned between the LED array 10 and the bottom cover 70. A through hole 76, through which the protrusion 13 and the connector 14 pass, is formed in a bottom surface of the heat sink 15 and the bottom surface of the bottom cover 70. A light source driver 150 generating a driving power required to drive the LEDs 11 is electrically fastened to the connector 14 exposed to the outside through the through hole 76. A process for fastening the light source driver 150 to the connector 14 is performed in a last assembly stage of a liquid crystal module including the backlight unit and a liquid crystal display panel.

When, after the connector 14 passes through the bottom surface of the bottom cover 70 and is exposed to the outside, the connector 14 and the light source driver 150 are fastened to each other outside the liquid crystal module, a complicated wiring operation inside the liquid crystal module may be omitted. Hence, an assembly performance of the liquid crystal module is greatly improved, and the assembly cost of the liquid crystal module is reduced. Further, after the assembly of the liquid crystal module is completed, a user can easily confirm whether or not the light source driver 150 is well fastened to the connector 14 from a back surface of the bottom cover 70 with his or her eyes. Furthermore, because an additional area for mounting the connector 14 in a longitudinal direction of the light source PCB 12 is not required, a narrow bezel technology can be very easily achieved.

FIGS. 4A to 4H illustrate various arrangement locations of the LED array in the edge type backlight unit.

Figure 4A:
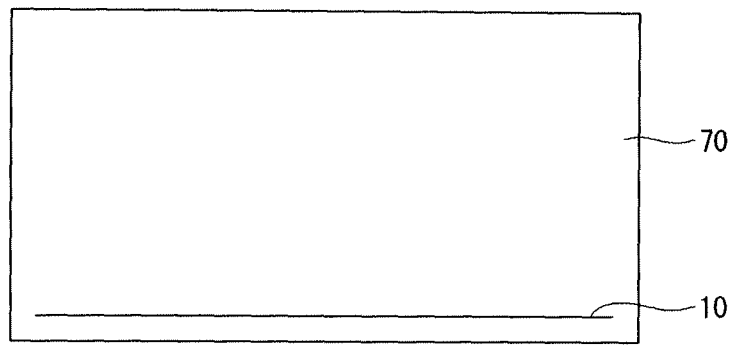
FIGS. 4A to 4H illustrate various arrangement locations of an LED array in an edge type backlight unit according to an exemplary embodiment of the invention.
Figure 4B:
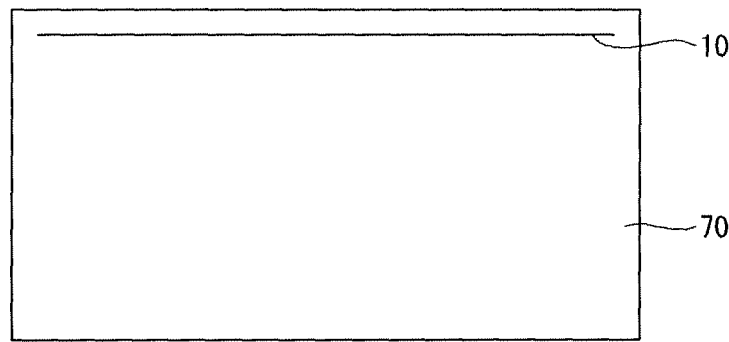
Figure 4C:
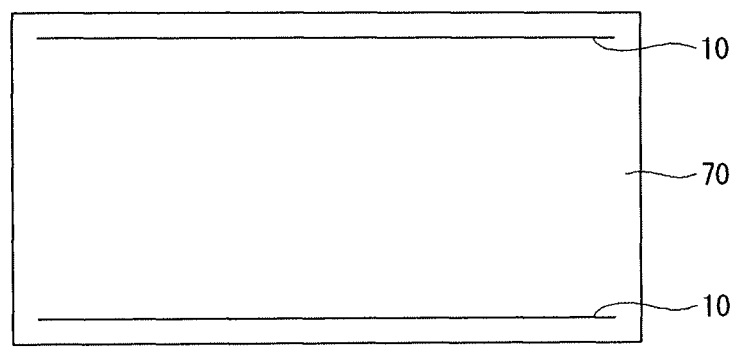
Figure 4D:
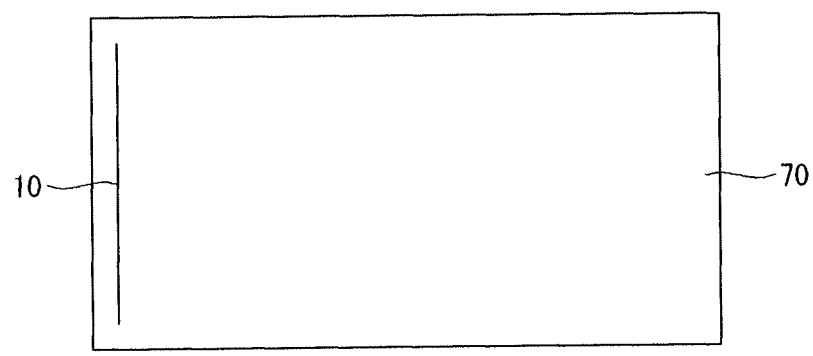
Figure 4E:
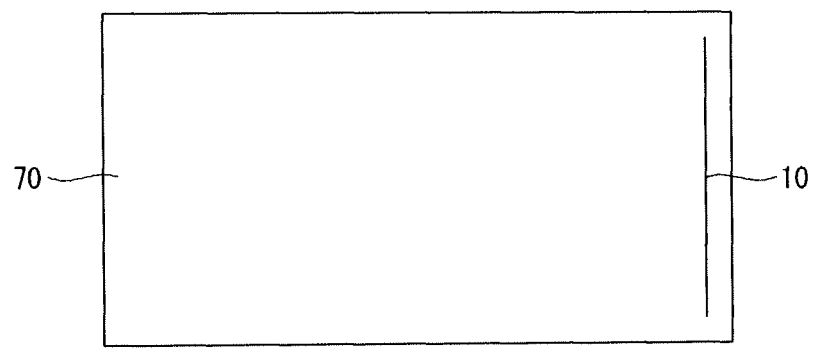
Figure 4F:
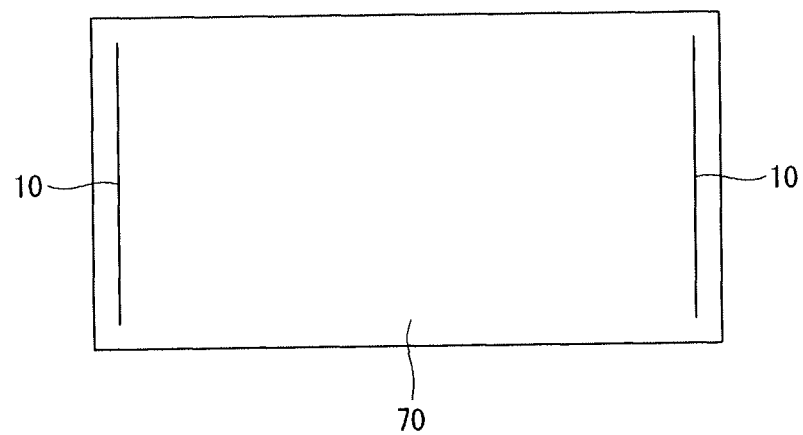
Figure 4G:
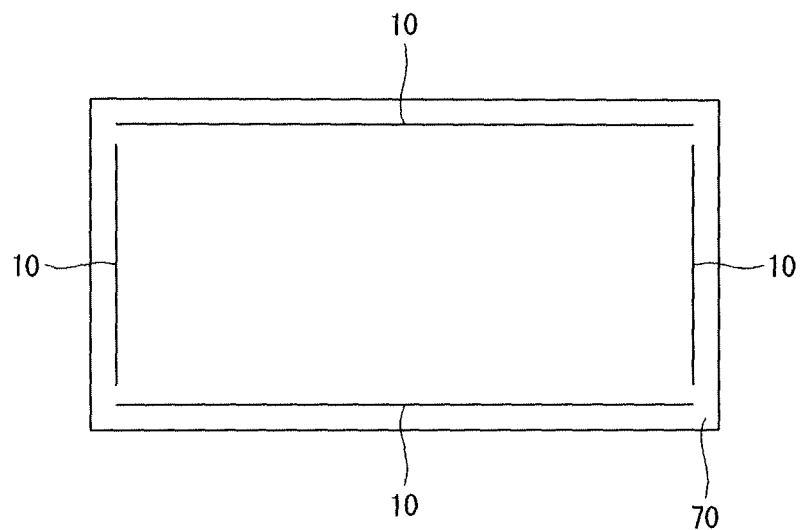
Figure 4H:
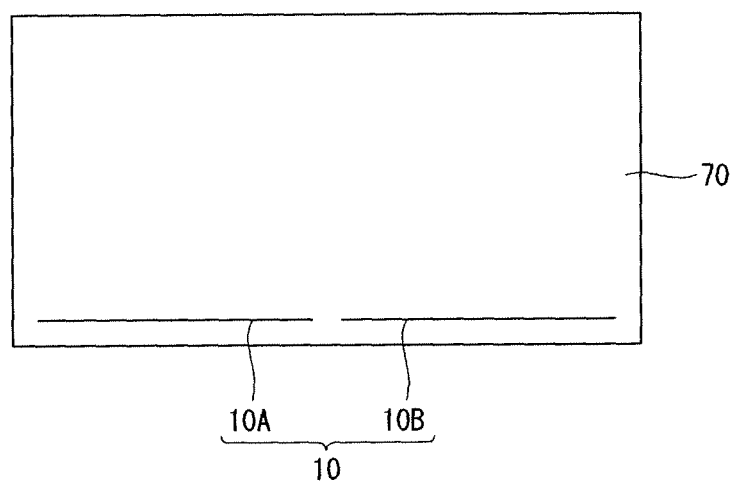

As shown in FIGS. 4A to 4H, the LED array 10 may be fastened to at least one of four side walls, i.e., upper, lower, left and right side walls of the bottom cover 70. For example, as shown in FIG. 4A, the LED array 10 may be fastened to the lower side wall of the bottom cover 70. As shown in FIG. 4B, the LED array 10 may be fastened to the upper side wall of the bottom cover 70. As shown in FIG. 4C, the LED array 10 may be fastened to the upper and lower side walls of the bottom cover 70. As shown in FIG. 4D, the LED array 10 may be fastened to the left side wall of the bottom cover 70. As shown in FIG. 4E, the LED array 10 may be fastened to the right side wall of the bottom cover 70. As shown in FIG. 4F, the LED array 10 may be fastened to the left and right side walls of the bottom cover 70. As shown in FIG. 4G, the LED array 10 may be fastened to the upper, lower, left and right side walls of the bottom cover 70. Further, as shown in FIG. 4H, the LED array 10 positioned at each side wall of the bottom cover 70 may be divided into two LED arrays 10A and 10B.

Although it is not shown, technical characteristics according to the exemplary embodiment of the invention may be applied to a direct type backlight unit in which the LED array is positioned on the bottom surface of the bottom cover 70.

Figure 5:
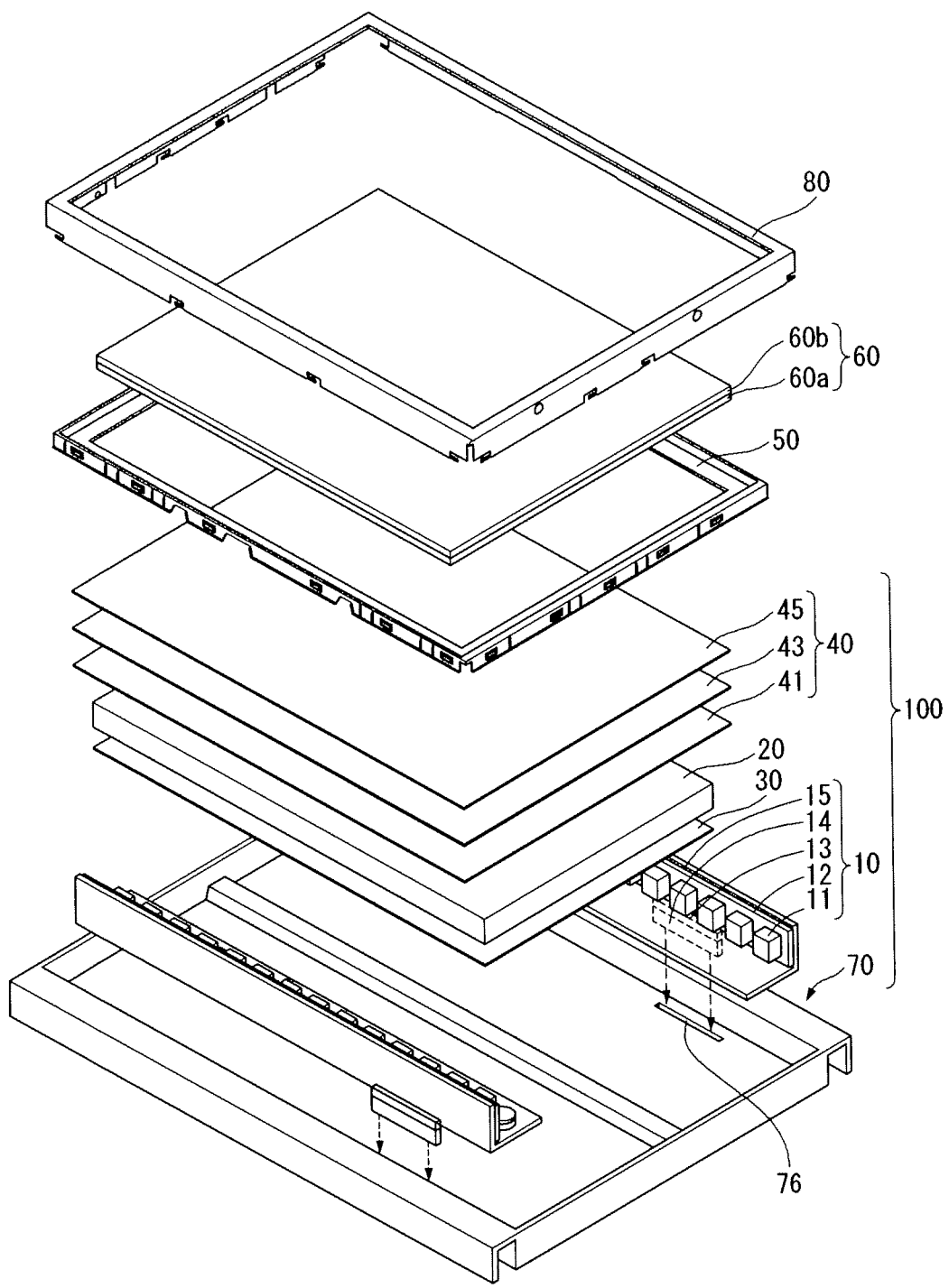
FIG. 5 is an exploded perspective view of a liquid crystal display according to an exemplary embodiment of the invention.
Figure 6:
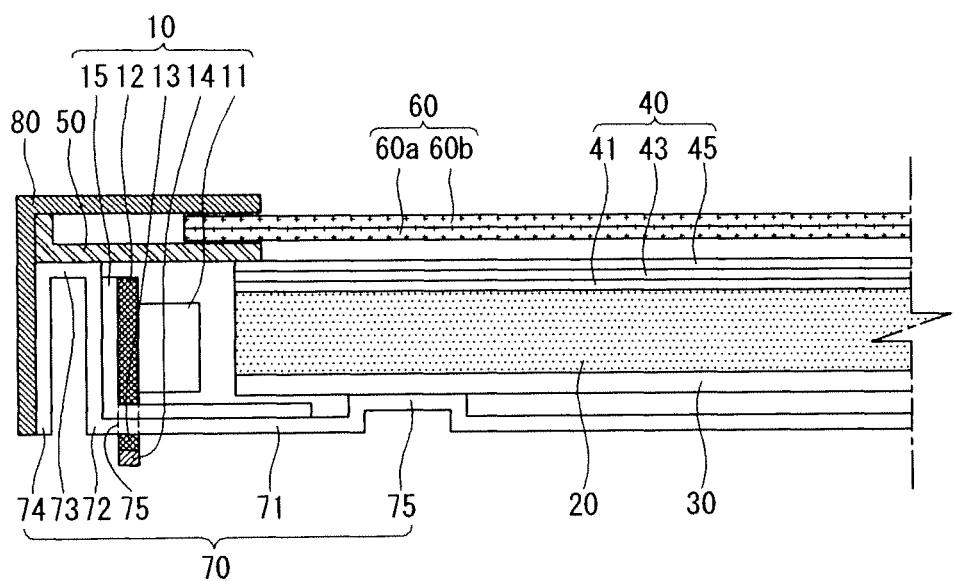
FIG. 6 is a partial cross-sectional view of FIG. 5.

Next, a liquid crystal display according to the exemplary embodiment of the invention is described. FIG. 5 is an exploded perspective view of a liquid crystal display according to the exemplary embodiment of the invention. FIG. 6 is a partial cross-sectional view of FIG. 5.

As shown in FIGS. 5 and 6, the liquid crystal display according to the exemplary embodiment of the invention includes a liquid crystal display panel 60, a panel guide 50, a backlight unit 100, and a top case 80.

The backlight unit 100 includes the LED array 10, a light guide plate 20 that converts light coming from the LEDs 11 into planar light and emits the planar light to the liquid crystal display panel 60, a reflection sheet 30 positioned under the light guide plate 20, a plurality of optical sheets 40 positioned on the light guide plate 20, and the bottom cover 70 receiving the above components 10, 20, 30, and 40.

The LED array 10 has the technical characteristics illustrated in FIGS. 2 to 4H.

The bottom cover 70 includes a horizontal part 71 that is the bottom surface on which the through hole 76 exposing the protrusion 13 and the connector 14 of the LED array 10 to the outside is formed, a first side wall 72 that is upward bent from the horizontal part 71 for a fastening of the LED array 10, a first supporter 73 that is bent from the first side wall 72 in a horizontal direction and supports the panel guide 50, and a second side wall 74 that is downward bent from the first supporter 73 and is positioned opposite the first side wall 72. The bottom cover 70 may further include a second supporter 75 that upward protrudes so as to support the light guide plate 20 and the reflection sheet 30.

The light guide plate 20 is supported by the second supporter 75 of the bottom cover 70, and the plurality of LEDs 11 are positioned opposite the side of the light guide plate 20. The light guide plate 20 converts light from the LEDs 11 into planar light and emits the planar light to the plurality of optical sheets 40 positioned on the light guide plate 20. The light guide plate 20 is formed of a material having a good refractive index and a good transmittance, for example, polymethylenemethacrylate (PMMA), polycarbonate (PC), polyethylene (PE), and cyclo olefin polymer (COP)-based resin. Other materials may be used for the light guide plate 20.

The reflection sheet 30 is positioned under the light guide plate 20. The reflection sheet 30 reflects light travelling in a lower direction of the light guide plate 20 (i.e., in a direction opposite the liquid crystal display panel 60) in an upper direction of the light guide plate 20 (i.e., to the liquid crystal display panel 60), thereby increasing the efficiency of light.

The optical sheets 40 are positioned between the liquid crystal display panel 60 and the light guide plate 20. The optical sheets 40 increase the uniformity of light incident through the light guide plate 20 and increase a luminance of light by refracting and focusing light. The optical sheets 40 include a diffusion sheet 41, a prism sheet 43, and a protective sheet 45. The diffusion sheet 41 diffuses light coming from the light guide plate 20. The prism sheet 43 includes a triangular prism-shaped microprism. The prism sheet 43 focuses diffusion light coming from the diffusion sheet 41 in a direction vertical to the surface of the liquid crystal display panel 60. The protective sheet 45 protects the prism sheet 43 weak to a scratch.

The liquid crystal display panel 60 includes a thin film transistor array substrate 60a on which thin film transistors are formed, and a color filter array substrate 60b that is positioned opposite the thin film transistor array substrate 60a and includes black matrixes, color filter, etc., thereby displaying an image. The thin film transistor array substrate 60a and the color filter array substrate 60b are sealed with a sealant. A liquid crystal layer is formed between the thin film transistor array substrate 60a and the color filter array substrate 60b.

The panel guide 50 is a rectangular mold frame obtained by injecting a glass fiber into a synthetic resin such as polycarbonate. The panel guide 50 supports the liquid crystal display panel 60.

The top case 80 is formed of a metal material and is fixed to at least one of the panel guide 50 and the bottom cover 70 using a hook (not shown) or a screw (not shown). The top case 80 covers the side of the panel guide 50 and the side of the bottom cover 70. The top case 80 covers an edge area (i.e., a bezel area) outside an effective display area of the liquid crystal display panel 60.

Figure 7:
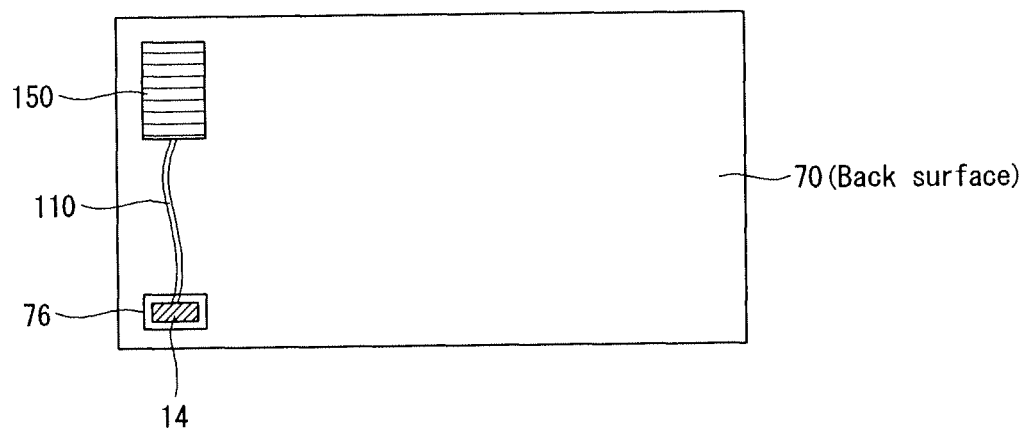
FIGS. 7, 8A, and 8B illustrate various connector fastening methods between an LED array and a light source driver on a back surface of a bottom cover.
Figure 8A:
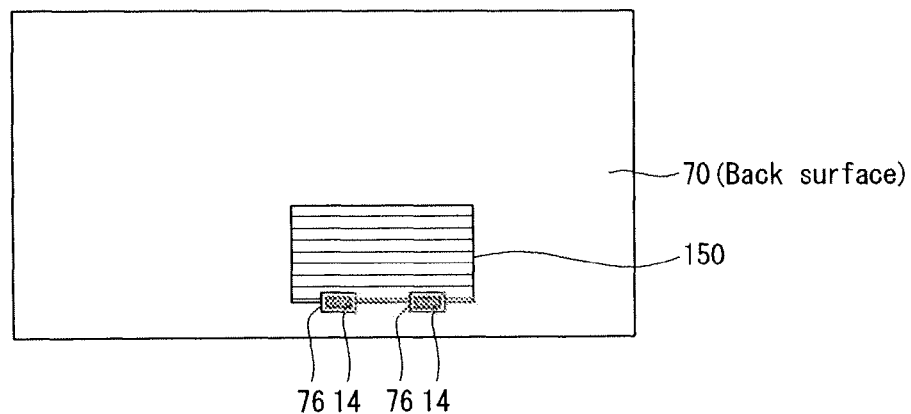
Figure 8B:
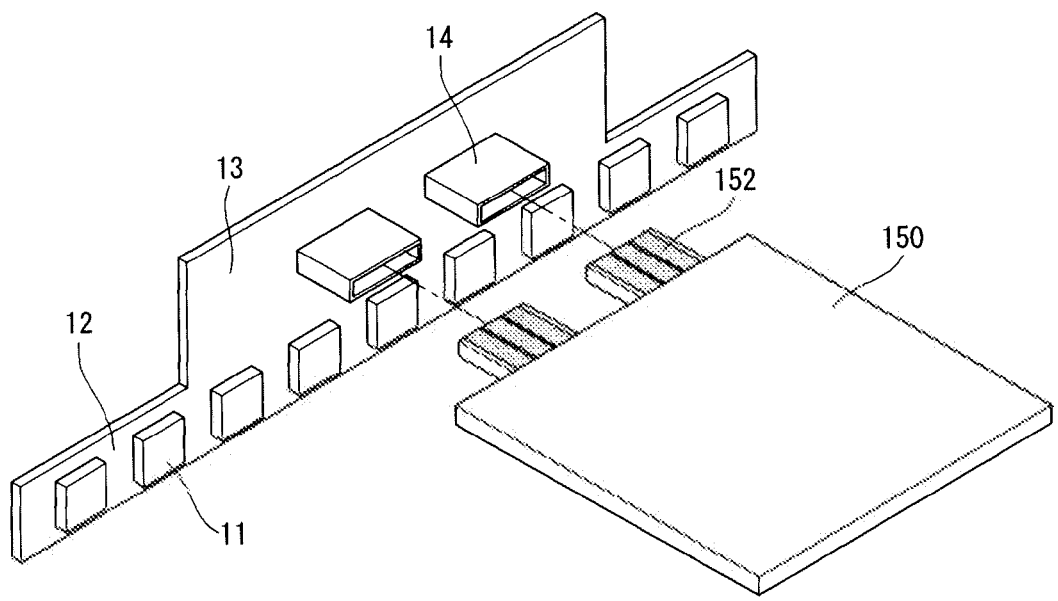

FIGS. 7, 8A, and 8B illustrate various connector fastening methods between the LED array and the light source driver on the back surface of the bottom cover.

As shown in FIG. 7, the connector 14 exposed to the back surface of the bottom cover 70 through the through hole 76 may be electrically connected to the light source driver 150 by a wire member 110. The wire member 110 may include a wire, a flexible flat cable (FFC), a flexible printed circuit board (FPC), and the like. The driving power generated by the light source driver 150 is transferred to the plurality of LEDs 11 via the wire member 110, the connector 14, and the protrusion 13 of the light source PCB 12.

As shown in FIGS. 8A and 8B, the connector 14 exposed to the back surface of the bottom cover 70 through the through hole 76 may be directly electrically connected to the light source driver 150 through a docking method. For this, the light source driver 150 may include a slot 152 capable of being inserted into the connector 14. The driving power generated by the light source driver 150 is transferred to the plurality of LEDs 11 via the slot 152, the connector 14, and the protrusion 13 of the light source PCB 12.

As described above, in the exemplary embodiment of the invention, when, after the connector 14 is exposed to the back surface of the bottom cover 70, the connector 14 and the light source driver 150 are fastened to each other outside the liquid crystal module, the complicated wiring operation inside the liquid crystal module may be omitted. Hence, the assembly performance of the liquid crystal module is greatly improved, and the assembly cost of the liquid crystal module is reduced. Further, after the assembly of the liquid crystal module is completed, the user can easily confirm whether or not the light source driver 150 is well fastened to the connector 14 from the back surface of the bottom cover 70 with his/her eyes. Furthermore, because the connector 14 is fastened to the protrusion 13 protruding in the width direction of the light source PCB 12, the additional area for mounting the connector 14 in the longitudinal direction of the light source PCB 12 is not required. As a result, the narrow bezel technology can be very easily achieved.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
    a plurality of light sources configured to generate light;
    a light guide plate configured to convert light coming from the light sources into planar light;
    a light source printed circuit board (PCB) on which the plurality of light sources are mounted;
    a protrusion that protrudes from one side of the light source PCB and is fastened to a connector used to supply a driving power to the plurality of light sources; and
    a bottom cover configured to receive the light source PCB and have a through hole through which the protrusion passes, wherein the bottom cover includes a horizontal part in which the through hole is formed, a first side wall that is bent upwardly from the horizontal part, a first supporter bent from the first side wall in a horizontal direction, and a second side wall that is bent downwardly from the first support, wherein the light source PCB is fastened to the first side wall of the bottom cover so that the light sources are positioned opposite a side of the light guide plate, wherein the first and second side walls and the light source PCB are parallel to each other, wherein the protrusion protrudes in a width direction of the light source PCB, and wherein the connector is exposed to the outside of a bottom surface of a horizontal part of the bottom cover through the through hole.

2. The backlight unit of claim 1, wherein the light source PCB is fastened to at least one of upper, lower, left, and right side walls of the bottom cover so that the light sources are positioned opposite the side of the light guide plate.

3. A liquid crystal display comprising:
a liquid crystal display panel configured to display an image; and
a backlight unit configured to provide light to a back surface of the liquid crystal display panel, the backlight unit including:
a plurality of light sources configured to generate light;
a light guide plate configured to convert light coming from the light sources into planar light;
a light source printed circuit board (PCB) on which the plurality of light sources are mounted;
a protrusion that protrudes from one side of the light source PCB and is fastened to a connector used to supply a driving power to the plurality of light sources; and
a bottom cover configured to receive the light source PCB and have a through hole through which the protrusion passes, wherein the bottom cover includes a horizontal part in which the through hole is formed, a first side wall that is bent upwardly from the horizontal part, a first supporter bent from the first side wall in a horizontal direction, and a second side wall that is bent downwardly from the first support, wherein the light source PCB is fastened to the first side wall of the bottom cover so that the light sources are positioned opposite a side of the light guide plate, wherein the protrusion protrudes in a width direction of the light source PCB, wherein the first and second side walls and the light source PCB are parallel to each other, wherein the first supporter supports the liquid crystal display panel, and wherein the connector is exposed to the outside of a bottom surface of the horizontal part of the bottom cover through the through hole.

4. The liquid crystal display of claim 3, wherein the light source PCB is fastened to at least one of upper, lower, left, and right side walls of the bottom cover so that the light sources are positioned opposite the side of the light guide plate.

5. The liquid crystal display of claim 3, further comprising a light source driver configured to generate the driving power,
wherein the connector is electrically connected to the light source driver through a wire member.

6. The liquid crystal display of claim 5, wherein the wire member is implemented as one of a wire, a flexible flat cable (FFC), and a flexible printed circuit board (FPC).

7. The liquid crystal display of claim 3, further comprising a light source driver configured to generate the driving power and have a slot,
wherein the connector is directly electrically connected to the light source driver through a fastening between the connector and the slot.

* * * * *